(12) United States Patent
Cohen

(10) Patent No.: US 7,793,215 B2
(45) Date of Patent: Sep. 7, 2010

(54) INDICATING FOCUS IN A PORTAL ENVIRONMENT

(75) Inventor: Gabriel A. Cohen, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1485 days.

(21) Appl. No.: 10/686,487

(22) Filed: Oct. 15, 2003

(65) Prior Publication Data

US 2005/0086609 A1 Apr. 21, 2005

(51) Int. Cl.
 *G06F 17/00* (2006.01)
 *G06F 17/20* (2006.01)
(52) U.S. Cl. ...................... 715/249; 715/742
(58) Field of Classification Search ............... 715/523, 715/517, 513, 526, 249, 742
 See application file for complete search history.

(56) References Cited

U.S. PATENT DOCUMENTS

| | | | |
|---|---|---|---|
| 6,018,341 A | | 1/2000 | Berry et al. |
| 6,918,090 B2* | | 7/2005 | Hesmer et al. ............... 715/760 |
| 7,174,512 B2* | | 2/2007 | Martin et al. ................ 715/719 |
| 2002/0010932 A1 | | 1/2002 | Nguyen et al. |
| 2002/0035728 A1 | | 3/2002 | Fries |
| 2002/0036660 A1 | | 3/2002 | Adan et al. |
| 2002/0122054 A1* | | 9/2002 | Hind et al. ................... 345/731 |
| 2002/0175951 A1 | | 11/2002 | Gajewska et al. |
| 2002/0194388 A1* | | 12/2002 | Boloker et al. .............. 709/310 |
| 2003/0005174 A1 | | 1/2003 | Coffman et al. |
| 2003/0023953 A1* | | 1/2003 | Lucassen et al. ............. 717/106 |
| 2003/0084405 A1* | | 5/2003 | Ito et al. ...................... 715/513 |
| 2003/0126558 A1* | | 7/2003 | Griffin ......................... 715/513 |
| 2004/0010755 A1* | | 1/2004 | Hamada ....................... 715/513 |
| 2004/0044785 A1* | | 3/2004 | Bell et al. .................... 709/238 |
| 2004/0068554 A1* | | 4/2004 | Bales et al. .................. 709/218 |
| 2004/0107449 A1* | | 6/2004 | Fukuda et al. ............... 725/135 |
| 2006/0026557 A1* | | 2/2006 | Petri ............................ 717/106 |

OTHER PUBLICATIONS

Hepper et al.; "Introducing the Portlet Specification Part 1" Java World; Aug. 2003; pp. 1-8.*

(Continued)

*Primary Examiner*—Doug Hutton
*Assistant Examiner*—James J Debrow
(74) *Attorney, Agent, or Firm*—Joseph E. Bracken, Esq.; Steven M. Greenberg, Esq.; Carey Rodriguez Greenberg & Paul LLP

(57) ABSTRACT

A method, system and apparatus for indicating input focus in a portal environment. A method for indicating user input focus in a portal environment can include assigning an unfocused style sheet to all unfocused portlets in a portal except for a focused portlet having input focus. A focused style sheet further can be assigned to the focused portlet having input focus. Subsequently, each of the focused and unfocused portlets can be rendered in the portal. Responsive to a new portlet in the portal acquiring the input focus from the focused portlet, the focused style sheet can be re-assigned to the new portlet while the unfocused style sheet can be re-assigned to the focused portlet which no longer has input focus. Subsequently, the new portlet and the focused portlet which no longer has input focus can be re-rendered in the portal according to the style sheets.

6 Claims, 3 Drawing Sheets

OTHER PUBLICATIONS

Ossenbruggen et al; "Style Sheet Support for Hypermedia Documents"; 1997; ACM.*

Pierce et al., "Interoperable Web Services for Computational Portals", 2002, IEEE, pp. 1-12.*

Pierce et al., "Interoperable Web Services for Computational Portals", IEEE, 2002, pp. 1-12.*

Fang et al., "ServiceFinder: A Method Towards Enhancing Service Portals", ACM, 2007, pp. 1-27.*

Anonymous Author, HTML 4.01 Reference, (visited Oct. 5, 2003) <http://www.w3schools.com/htm/html_reference.asp>.

* cited by examiner

INDICATING FOCUS IN A PORTAL ENVIRONMENT

BACKGROUND OF THE INVENTION

1. Statement of the Technical Field

The present invention relates to the field of rendering a portal user interface and more particularly to tracking portlet focus within a portal user interface.

2. Description of the Related Art

Distributing content about large computer communications networks is not without its challenges. In particular, the quantity of content available for distribution in a computer communications network often varies proportionally to the size of the computer communications network. At the extreme, the Internet hosts a vast quantity of content not easily accessible by most end-users. Portals represent a sensible solution to the problem of aggregating content through a channel paradigm in a single, network-addressable location. In consequence, portals have become the rage in content distribution.

Portlets are the visible active components included as part of portal pages. Similar to the graphical windows paradigm of windowing operating systems, each portlet in a portal occupies a portion of the portal page through which the portlet can display associated content from a portlet channel. Portlets are known to include both simple applications such as an electronic mail client, and also more complex applications such as forecasting output from a customer relationship management system. The prototypical portlet can be implemented as server-side scripts executed through a portal server.

From the end-user perspective, a portlet is a content channel or application to which the end-user can subscribe. By comparison, from the perspective of the content provider, a portlet is a means through which content can be distributed in a personalized manner to a subscribing end-user. Finally, from the point of view of the portal, a portlet merely is a component which can be rendered within the portal page. In any case, by providing one or more individually selectable and configurable portlets in a portal, portal providers can distribute content and applications through a unified interface in a personalized manner according to the preferences of the end-user.

Portal servers are computer programs which facilitate the distribution of portal based Web sites on the public Internet or a private intranet. Importantly, it will be recognized by one of ordinary skill in the art that the signature characteristic of all conventional portal servers can include the aggregation of content from several portlet applications within a single distributable page in a uniform manner. To that end, each portlet application within the portal page can be represented by a portlet user interface distributed by the portal server to requesting client computing devices.

For the interactive portlet applications, a two-way portlet user interface can be provided. In the two-way user interface of the portlet application, user input can be forwarded to the portal server through the use of a submit action in which the user input can be posted or otherwise provided to the portal server. Subsequently, the portal server can forward the user input to the appropriate portlet application in which the user input can be processed by the application portlet. In this way, the portal can be viewed as a logical extension to the Web application in which the Web application has been formalized in terms of user and application interface. Some have postulated that the portal merely represents the next generation of the Web application.

In the portal environment, multiple Web applications share the same Web page. When more than one of the Web applications within a Web page are interactive, it can be difficult to easily determine which application has the user focus. Within a single Web application, a mechanism already exists for tracking the focus of individual elements, either by surrounding a hyperlink with a selection box, or by placing a cursor within the input field. Yet, no mechanism exists for indicating which particular form within a Web application will be submitted if there are multiple forms declared within respective Web applications in a single portal page. Specifically, when client side scripts exclusive of the portal facilitate keyboard and mouse input within a portlet disposed in the portal, there is no way to determine which portlet has the current input focus.

SUMMARY OF THE INVENTION

The present invention addresses the deficiencies of the art in respect to tracking the input state of individual portlets in a portal environment and provides a novel and non-obvious method, system and apparatus for indicating input focus in a portal environment. In a preferred aspect of the present invention, a method for indicating user input focus in a portal environment can include assigning an unfocused style sheet to all unfocused portlets in a portal except for a focused portlet having input focus. A focused style sheet further can be assigned to the focused portlet having input focus. Subsequently, each of the focused and unfocused portlets can be rendered in the portal.

Responsive to a new portlet in the portal acquiring the input focus from the focused portlet, the focused style sheet can be re-assigned to the new portlet while the unfocused style sheet can be re-assigned to the focused portlet which no longer has input focus. Subsequently, the new portlet and the focused portlet which no longer has input focus can be re-rendered in the portal according to the style sheets. Preferably, a unique identifier can be defined in each portlet in the portal. Additionally, a global focus identifier can be specified with a unique identifier of the focused portlet. Consequently, responsive to the new portlet in the portal acquiring the input focus, the global focus identifier can be re-specified with a unique identifier of the new portlet.

Preferably, the re-assigning and re-rendering steps can be performed through a script embedded in the portal. In this regard, the portal can be defined in a markup language document. Moreover, a divisible section of the markup language document can be defined for each of the focused and unfocused portlets. In this way, the assigning and further assigning steps can be performed by specifying a class attribute for each of the focused and unfocused portlets. The class attribute, in turn, can correspond to a style sheet selected from the group consisting of the focused style sheet and the unfocused style sheet. Moreover, the script can be associated with each event attribute in the divisible section which indicates when a corresponding one of the focused and unfocused portlets has acquired the input focus.

A system for indicating input focus in a portal environment can include a focused style sheet and an unfocused style sheet. The system further can include a portal defining multiple portlets. The portlets can include a single focused portlet configured for rendering according to the focused style sheet, and a remaining set of unfocused portlets configured for rendering according to the unfocused style sheet. Notably, a global indicator can be disposed within the portal specifying the single focused portlet. Finally, a global script also can be disposed within the portal.

In particular, the global script can be programmed to change the global indicator to specify a newly focused portlet when the newly focused portlet acquires input focus from the single focused portlet. The global script further can be programmed to re-render the newly focused portlet in the portal according to the focused style sheet and to re-render the single focused portlet in the portal according to the unfocused style sheet. Notably, the focused style sheet and unfocused style sheet can be defined according to the content style sheet (CSS) specification. In this regard, the portal can include markup comprising a multiplicity of divisible sections, each of the divisible sections defining a single one of the portlets.

Each of the divisible sections can include a set of attributes, at least one of the attributes specifying a class corresponding to one of the focused style sheet and unfocused style sheet. At least one the attributes can specify a unique identifier for the single one of the portlets. Moreover, at least one of the attributes can associate the global script with an event which occurs when the single one of the portlets acquires user input focus. Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the illustration is not limited to the precise arrangements and instrumentalities shown, wherein.

DETAILED DESCRIPTION OF THE PREFERRED EMBODIMENTS

The present invention is a method, system and apparatus for indicating input focus in a portal environment. In accordance with the present invention, a single portlet within a portal environment can be rendered according to a unique content rendering style which differs from the content rendering style of other portlets in the portal environment. The single portlet having the unique content rendering style can be the portlet which enjoys user input focus. Each portlet disposed within a portal can be configured to detect when the portlet has acquired the user input focus. Upon acquiring focus, the portlet can call globally accessible logic for shifting the unique content rendering style from the portlet which previously had input focus, to the portlet which acquired the user input focus. Conversely, the portlet which previously had enjoyed user input focus can be re-rendered according to the content rendering style of the portlets which do not enjoy the user input focus.

Figure 1:
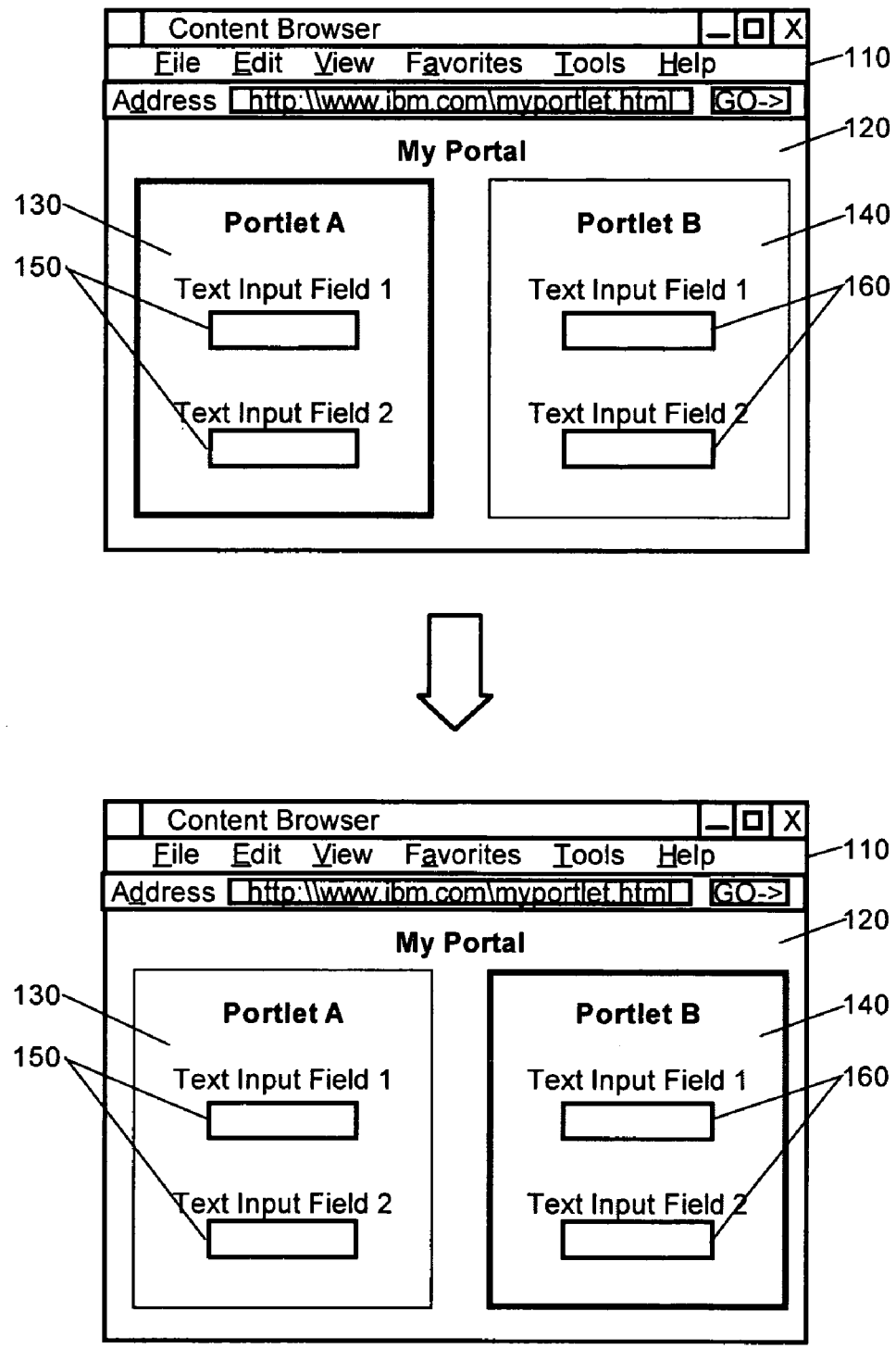
FIG. 1 is pictorial sequence depicting a process for indicating input focus in a portal environment in accordance with the inventive arrangements.

In further illustration of the preferred aspects of the present invention, FIG. 1 is pictorial sequence depicting a process for indicating input focus in a portal environment in accordance with the inventive arrangements. Specifically, FIG. 1 includes two separate screen shot illustrations of a portal server environment. In the top screen shot illustration, a content browser 110 has rendered a portal page 120 having two portlet applications 130, 140. The first portlet application 130 can include a number of input fields 150 defining a form, and the second portlet application 140 can include a number of input fields 160 defining a form. As it will be apparent to the skilled artisan, the first portlet application 130 can be rendered using a style programmed to indicate that the first portlet application 130 holds the user input focus for the portal page 120. By comparison, the second portlet application 140 can be rendered using a style programmed to indicate that the second portlet application 140 does not hold the user input focus for the portal page 120. In each case, the style can include any visual arrangement, such as the inclusion of a specialized icon within the view, the disposition of indicative text within the view (e.g. "FOCUSSED" and "UN-FOCUSSED"), or any other visual means.

When the user transitions focus from the first portlet application 130 to the second portlet application 140, for instance by "tabbing over" to the second portlet application 130, or by selecting the second portlet application 130 using a pointing device, the portal form 120 can be re-drawn as shown in the bottom screen shot illustration. In particular, the first portlet application 130 can be rendered using a style programmed to indicate that the first portlet application 130 no longer holds the user input focus for the portal page 120, while the second portlet application 140 can be rendered using a style programmed to indicate that the second portlet application 140 now holds the user input focus for the portal page 120.

Significantly, while the screen shot sequence of FIG. 1 may seem ordinary in view of the conventional graphical user interface of windowing operating systems, the skilled artisan will recognize inherent and insurmountable differences which make the FIG. 1 seem anything but ordinary. Namely, in the traditional windowing operating system visual cues to indicate window focus can be tightly controlled by the operating system because the individual windows rely upon the operating system for their very existence. As a result, each individual window can discover the state of other windows in the operating system and each individual window can indirectly modify the visual presentation of the other windows through direct contact with the application programming interface of the operating system.

By comparison, in the portal environment, a significantly greater degree of independence exists as between portlets and their host portal page. Consequently, the individual portlets have no way to know the state of the other portlets in the portal page. Moreover, the individual portlets have no way to modify the behavior of the portlets. Finally, in the portal context, there exists no mechanism for orchestrating the coordinated visual presentation of each individual portlet disposed within the portal page. Rather, client side logic often controls the keyboard and pointing device interaction with a portlet in a manner which remains independent from the logic of the portal page. Accordingly, the result demonstrated in FIG. 1 represents a substantial departure from the known art.

Figure 2:
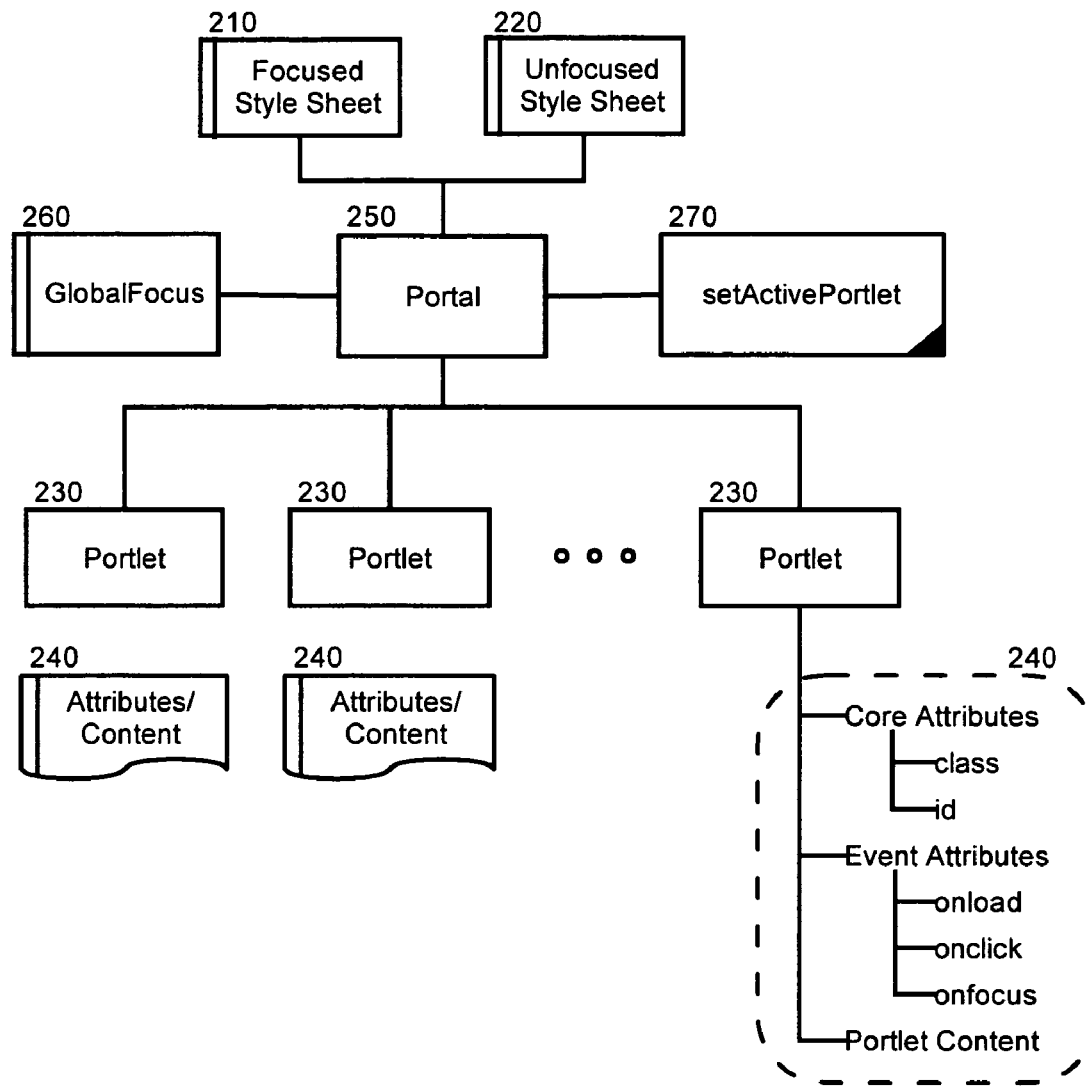
FIG. 2 is a block diagram illustrating a system for indicating input focus in a portal environment; and, FIG. 3 is a flow chart of a process for setting input focus in the portal environment of FIG. 2.

To better explain the operation of the present invention in the context of FIG. 1, FIG. 2 is a block diagram illustrating a system for indicating input focus in a portal environment. The system of the present invention can include a portal page 250 configured with a plurality of portlets 230 disposed within the portal page 250. Each of the portlets 230 can be separately defined within the portal page 250, for instance using the "DIV" tag known in the art. The DIV tag of each portlet 250 can include a set of attributes and can encapsulate a set of portlet content 240. The attributes can include core attributes such as a unique identifier, as well as a specification of a class of rendering style such as the specification of a content style sheet class. The event attributes can specify particular logic to be invoked in response to certain events arising within the portlet 230, such as an initial loading event, a mouse click event, and a received focus event.

Importantly, an indication 260 of a portlet having the global focus within the portal page 250 can be disposed within the portal page 250. Additionally, both a focused style sheet 210 and an unfocused style sheet 220 can be coupled to the portal page 250. The style sheets 210, 220 can include presentation layer instructions for rendering content formatted with generic rendering instructions corresponding to companion rendering instructions in the style sheets 210, 220. As it is well known in the art of content style sheet (CSS) formatting, the generic rendering instructions can be specifically defined with specific rendering instructions in the style sheets 210, 220. In this way, by merely substituting the specification of one of the style sheets 210, 220 for another, the visual look and feel of the portlet 230 can change dramatically. Hence, in the present invention, the focused style sheet 210 can provide a set of visual rendering instructions which can produce a visually distinct rendering of a portlet when compared to a portlet which has been rendered using the unfocused style sheet 220.

Finally, setActivePortlet logic 270 can be disposed within the portal page 250. The set ActivePortlet logic 270 can be coupled to the event attributes of the portlets 230 and can modify the visual presentation of a portlet 230 which has received the input focus so as to visually indicate that the portlet 230 has received the input focus. To achieve this effect, the portlet 230 which formerly had acquired user input focus can be re-rendered according to the unfocused style sheet 220. Conversely, the portlet 230 which had most recently acquired user input focus can be re-rendered according to the focused style sheet 210. To track which of the portlets 230 presently holds the user input focus, the indication 260 of global focus can reference the portlet 230 presently holding focus.

Initially, as each portlet 230 loads within the portal page 250, each portlet 230 can check the indication 260 to determine if a portlet 230 already has acquired the user input focus. If the indication 260 is null in value, it can be presumed that none of the portlets 230 has acquired the user input focus. Consequently, the first of the portlets 230 to detect a null valued indication 260 can acquire the user input focus by referencing itself in the indication 260 and by rendering itself according to the focused style sheet 210. Subsequently loading portlets 230 can detect a non-null value for the indication 260 and can render themselves using the unfocused style sheet 220.

Figure 3:
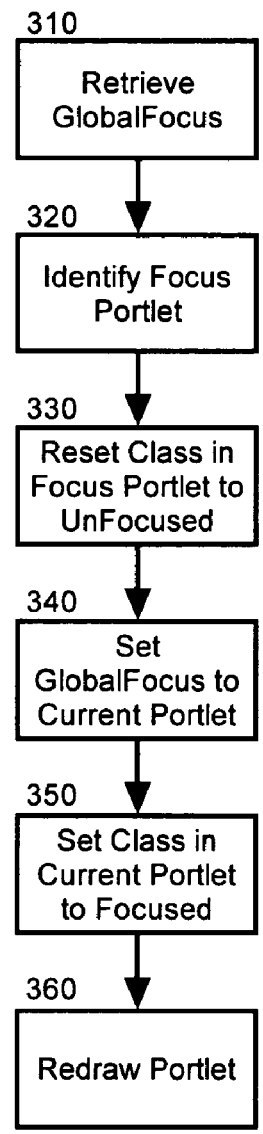

Once the portal page 250 has been completely rendered, user interaction can be accepted in the portal page 250 and the user will be free to shift user input focus from one portlet 230 to the next. When the user input focus has shifted, the setActivePortlet logic 270 can set the input focus accordingly. More specifically, FIG. 3 is a flow chart of a process for setting input focus in the portal environment of FIG. 2. In this regard, in blocks 310 and 320 the global focus indication can be retrieved to identify the portlet which previously held the user input focus. Subsequently, in block 330, the CSS class of the identified portlet as specified by the DIV tag attribute "class" can be reset to the unfocused CSS class.

In block 340, the global focus indication can be changed to reflect the current portlet which has acquired the user input focus. Also, in block 350 the CSS class of the current portlet as specified by the DIV tag attribute "class" can be changed to reflect the focused CSS class. Finally, in block 360, each of the portlets can be redrawn using the newly specified respective CSS classes. In this regard, the focused CSS class can cause the visual rendering of the current portlet to differ from the visual rendering of the identified portlet and all other portlets in the portal page. By emphasizing the unique rendering of the current portlet over all other portlets, it will be apparent to the end user that the input focus has shifted to the current portlet.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A system for indicating input focus in a portal environment, the system comprising:

a processor;

a focused style sheet and an unfocused style sheet;

a portal defining a plurality of portlets, said portlets comprising a single focused portlet configured for rendering according to said focused style sheet, and a remaining set of unfocused portlets configured for rendering according to said unfocused style sheet;

a global indicator disposed within said portal specifying said single focused portlet; and, a global script disposed within said portal programmed to change said global indicator to specify a newly focused portlet when said newly focused portlet acquires input focus from said single focused portlet, to re-render said newly focused portlet in said portal according to said focused style sheet and to re-render said single focused portlet in said portal according to said unfocused style sheet.

2. The system of claim 1, wherein said focused style sheet and unfocused style sheet are defined according to a content style sheet specification.

3. The system of claim 1, wherein said portal comprises markup comprising a plurality of divisible sections, each of said divisible sections defining a single one of said portlets.

4. The system of claim 3, wherein each of said divisible sections comprises a set of attributes, at least one of said attributes specifying a class corresponding to one of said focused style sheet and unfocused style sheet.

5. The system of claim 4, wherein at least one said attributes specifies a unique identifier for said single one of said portlets.

6. The system of claim 4, wherein at least one of said attributes associates said global script with an event which occurs when said single one of said portlets acquires user input focus.

* * * * *